Nov. 27, 1934.  C. H. HAVILL  1,982,162
PROPELLER
Filed Jan. 28, 1932  2 Sheets-Sheet 1
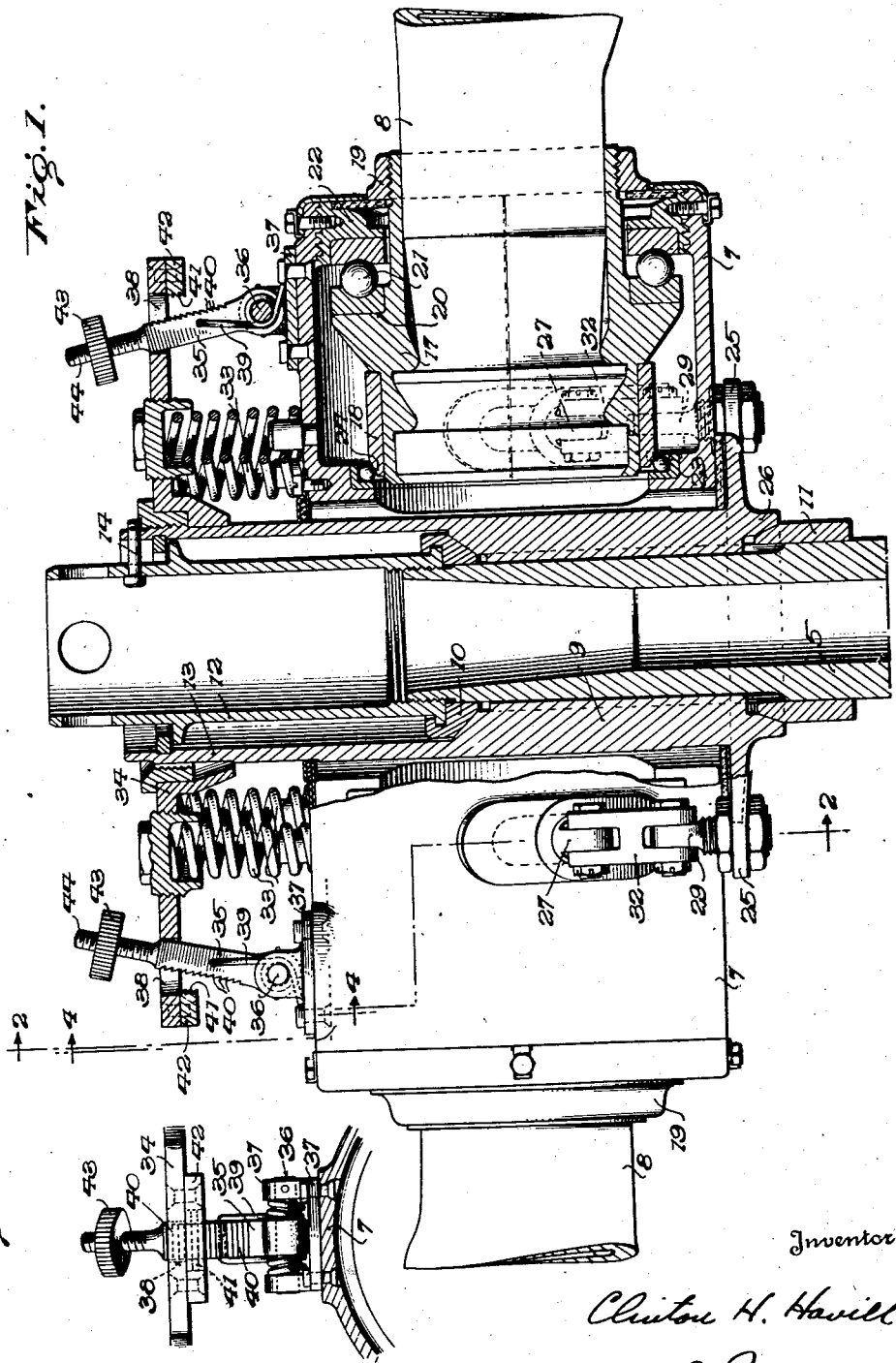
Inventor
Clinton H. Havill
By
N. W. Parker Jr.
Attorney Nov. 27, 1934.   C. H. HAVILL   1,982,162
PROPELLER
Filed Jan. 28, 1932   2 Sheets-Sheet 2
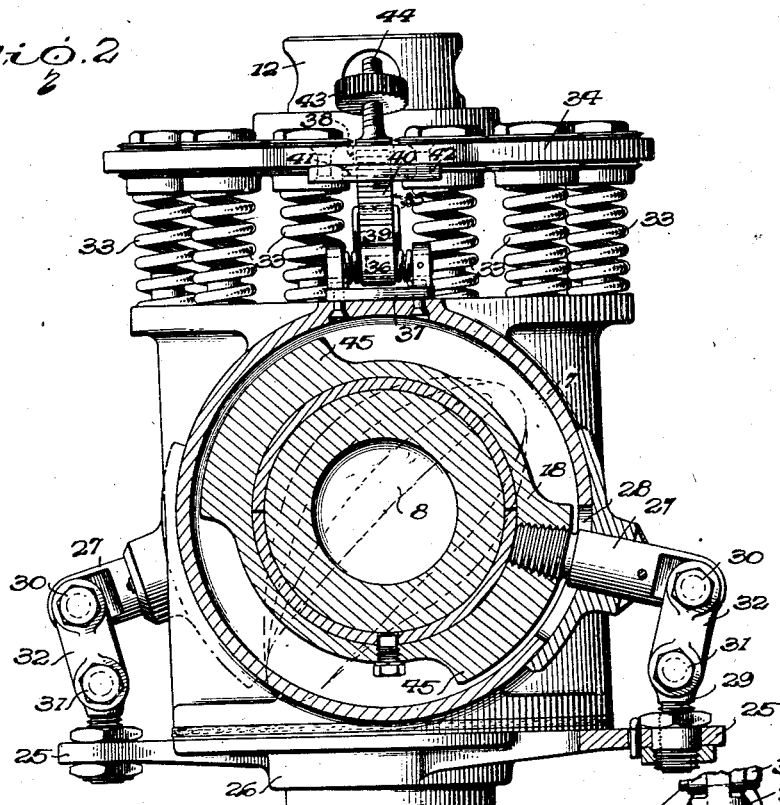
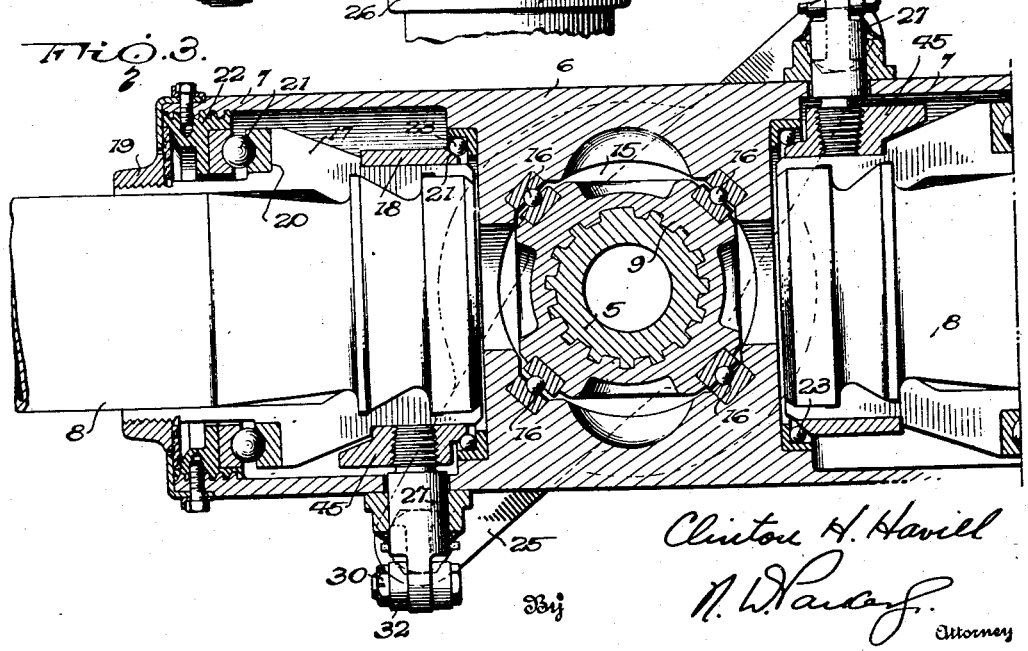

Patented Nov. 27, 1934

1,982,162

UNITED STATES PATENT OFFICE 1,982,162

PROPELLER

Clinton H. Havill, South Orange, N. J., assignor, by mesne assignments, to Eclipse Aviation Corporation, East Orange, N. J., a corporation of New Jersey Application January 28, 1932, Serial No. 589,478

19 Claims. (Cl. 170—162)

This invention relates to propellers and more particularly to propellers of the type having a plurality of blades, the angularity or pitch of which may be varied during operation.

It has heretofore been proposed to construct variable pitch propellers in such a manner that the pitch of the blades thereof is automatically varied during operation of the propeller, such construction presenting numerous advantages and desirable features not present in the well-known fixed pitch wood type propeller or even the propellers of the character wherein the pitch or angularity of the blades may be adjusted while the propeller is not in operation but incapable of adjustment when the propeller is rotating. Numerous of the variable pitch propellers of the automatic type referred to, have utilized one or another of the various forces present during operation of the propeller as a source of power to operate the pitch-changing mechanism, such as, for example, the centrifugal force developed by the blades during operation, the centrifugal force developed in auxiliary mechanism, the thrust of the blades, etc. In such installations, it has been sought to vary the pitch of the propeller blades in order to secure maximum propeller efficiency during all conditions encountered during flight, such as take-off, climbing, cruising, etc., while at the same time endeavoring to maintain the rate of revolutions of the engine driving the propeller substantially constant at a value such as to secure maximum engine efficiency during such variable flight conditions.

When propellers of the above mentioned type have heretofore been operated during such conditions as mentioned above, it has been determined that in many instances the pitch of the blades is often decreased to such a value as to effect a substantial increase in the speed of rotation of the engine to such an extent as to cause the efficiency of the latter to be materially reduced. Such operation presents many difficulties, among which may be mentioned a loss in efficiency of the engine, and the danger that the engine speed might reach an excessively high value such as to effect a possible breaking or fracture of certain of the operative parts thereof.

It is accordingly one of the objects of the present invention to provide a novel variable pitch propeller construction so constituted as to avoid the above mentioned difficulties.

Another object of the invention is to provide a variable pitch propeller embodying a novel arrangement for preventing the speed of the engine from reaching a dangerously high value.

Another object is to provide in an automatic variable pitch propeller, a novel mechanism automatically operable during rotation of the propeller for positively arresting a further decrease in the pitch of the blades, once the pitch has attained a predetermined minimum.

Still another object is to provide a propeller having a plurality of blades, the pitch of which is automatically varied during operation in accordance with the thrust of the blades in combination with a novel device effective during operation of the propeller to positively limit the pitch attainable by the blades.

A further object is to provide in a variable pitch propeller of the automatic type, a novel construction including a centrifugally-governed stop mechanism for limiting the pitch of the blades.

Still another object is to provide in a propeller of the type embodying a hub movable axially of the driving shaft for changing the pitch of the blades, a novel device carried by the hub and responsive to centrifugal force for positively arresting relative movement of the hub with respect to the shaft in order to positively limit the reduction in the pitch of the blades during operation of the propeller.

A still further object is to provide a novel variable pitch propeller construction embodying relatively few parts, so arranged as to obtain a light-weight and compact structure capable of ready adaptation to existing types of aircraft engines.

The above and other objects and novel features of the invention will appear more fully hereinafter from the following detailed description when taken in connection with the accompanying drawings, wherein similar reference characters refer to similar parts throughout the several views. It is to be expressly understood, however, that the drawings are for purposes of illustration only and are not designed as a definition of the limits of the invention, reference being had for this purpose to the appended claims.

In the drawings:

Fig. 1 is a plan view partly in section of a propeller embodying the present invention;

Fig. 2 is a side view partly in section of the parts illustrated in Fig. 1;

Fig. 3 is a partial axial sectional view of the propeller; and

Fig. 4 is a detail partly in section of the centrifugally-governed stop mechanism.

Referring more particularly to Figs. 1 and 3, a variable pitch propeller embodying the principles of the present invention is illustrated therein as being constituted by a rotatable engine shaft or extension thereof 5, and a hub 6 drivably connected thereto but relatively movable longitudinally thereof in response to the thrust exerted by the blades, the hub being provided with a plurality of radially-extending sockets 7 adapted to rotatably receive the inner or root ends of propeller blades 8, there being also provided suitable means for rotating the blades 8 in their respective sockets to vary the pitch of said blades during the aforesaid thrust-responsive movement of the hub relative to the shaft, as will appear more fully hereinafter.

For effecting a drivable connection between the hub 6 and the shaft 5, a driving member or block 9 is suitably splined to the shaft, Figs. 1 and 3, and is preferably rigidly maintained thereon by many suitable means, such as, for example, split front and rear cones 10 and 11 respectively, a nut 12 threadedly received by the outer end of shaft 5 and interlocked with the front cone 10 being provided for maintaining these parts in proper operative relation with respect to the shaft. After assembly of the parts heretofore mentioned, the nut 12 is preferably locked to an outwardly extending portion 13 of the driving block 9 by any suitable means such as pin 14. The hub 5 is provided with a centrally disposed aperture or opening 15, Fig. 3, which is adapted to receive the driving block 9, and a plurality of rows of ball bearings 16 are interposed between the driving block and hub in order to permit relative longitudinal movement between these two members in a substantially frictionless manner.

Means are provided for rotatably mounting the inner or root ends of the blades 8 within the sockets 7, and preferably such means are constituted in such a manner as to permit employment of the type of propeller blades now in common use. As shown, such means include a longitudinal split sleeve 17, the two parts thereof being firmly secured around the root ends of the blades by means of a collar 18 and outer ring 19 threadedly received by a portion of the sleeve projecting from the socket 7, it being pointed out that the collar 18 is firmly secured to the sleeve and blade root. The exterior surface of the sleeve is preferably so formed as to provide an annular shoulder 20 adapted to form an inner seat for an annular row of ball thrust bearings 21, the outer seat for said bearings being carried by a thrust ring 22 threadedly received by the outer ends of each of the sockets 7 and serving to maintain the propeller blades 8 securely within said sockets in opposition to the effect of centrifugal force effective on the blades tending to withdraw the same from their mounting. Preferably there is also provided a plurality of ball bearings 23 positioned within each socket at the inner ends thereof between the hub 6 and a skirt 24 of ring 18, in order to decrease the resistance to rotation of each blade in its respective socket.

Means are provided for interconnecting the rotatable shaft and each respective blade in such a manner as to effect a rotation of the blades in their respective sockets to vary the pitch thereof during longitudinal or axial movement of the hub with respect to the shaft, and preferably such means are secured to the shaft rearwardly of the propeller hub. In the form of the invention illustrated, such means are constituted by a lever or link mechanism, Fig. 2, one end of which is operatively connected with the collar 18, while the other end is secured to a lateral extension or arm 25 formed integrally with a plate 26 carried by the shaft 4 and disposed rearwardly of the hub 6. More particularly, the above link mechanism comprises a stud 27 secured to the collar 18 and extending laterally of the propeller blade and through a suitable aperture 28 formed in the hub socket 7, and a bolt 29 threadedly received by the arm 25, the bolt and arm being pivotally connected, as by means of bolts 30 and 31, to the bifurcated end portions of a link 32, see Fig. 2. From this construction, it will be appreciated that since one end of the link mechanisms is rigidly connected to the shaft 5, the said mechanisms will effect rotation of each respective blade about its longitudinal axis in order to vary the pitch during longitudinal thrust-responsive movement of the hub relative to the shaft.

In order to yieldingly oppose forward axial movement of the hub with respect to the shaft for the purpose of arresting such movement at certain positions along the shaft in accordance with the degree of thrust exerted by the blades under the existing conditions, there is preferably provided a plurality of resilient members, such as, for example, coil springs 33, arranged in a circle concentric with respect to the shaft and interposed between the hub 6 and a plate 34 secured in any suitable manner to the portion 13 of the driving block 9. It is pointed out that when the parts are in the position shown in Fig. 1, the pitch of the blades is a maximum, the pitch being gradually reduced during forward movement of the hub relative to the shaft in response to the thrust of the blades, the above mentioned resilient members 33, however, serving to yieldably oppose such movement and to arrest the hub in such a position relative to the shaft that the pitch of the blades assumed will be substantially proportional to the thrust thereof and such as to yield a substantially maximum propeller efficiency for the conditions of thrust imposed.

In order to positively arrest forward movement of the hub with respect to the shaft to effect a positive limit to which the pitch of the blades may be reduced, there is provided a stop mechanism carried by the hub and having a portion operable to positively engage a part of the plate 34, and preferably such mechanism is so constituted as to be centrifugally governed. As shown, such mechanism comprises a plurality of stop members 35 which may be disposed on either side of the axis of shaft 5, each of said members being pivotally mounted upon a pin 36 carried by a bracket 37 positioned on the hub socket 7. Each of the stop members 35 extends through an aperture 38 provided in the plate 34 and is preferably resiliently maintained in the position shown in Fig. 1 as by means of a spring 39. One side of each stop member 35 is provided with suitable teeth 40 so constituted as to engage corresponding teeth 41 formed on a member 42 carried by the plate 34, the construction being such that when the members 35 move about their pivotal mountings in one direction, the teeth 40 and 41 will engage and prevent further movement of the hub with respect to the shaft in a direction to further reduce the pitch of the blades. In order that the members 35 may be responsive to centrifugal force developed at the predetermined speed of rotation of the propeller at which it is desired to arrest a further reduction in the pitch of the blades, the outer ends of said members are provided with weights 43 which are preferably adjustable upon the outer threaded ends 44 of the members 35 in order to permit accurate adjustment of the location of the weights 43 and thus accurately predetermine the speed at which the members 35 will move outwardly due to centrifugal force to effect an engagement between the same members and the stop 42.

In order to substantially neutralize or compensate the propeller from the effects of torsion on the blades, the net effect of which is to constantly tend to decrease the pitch of the blades while the propeller is operating or, as viewed in Fig. 2, tends to turn or twist the blade 8 in a clockwise direction to effect a forward movement of the hub and consequent reduction in pitch of the blade, the collars 18 associated with the root ends of each blade are counterweighted or enlarged at diametrically opposed sides as indicated at 45. The effect of these counterweights, as will be more particularly pointed out hereinafter, is to substantially oppose or offset the net torsion on each respective blade while the propeller is rotating.

During operation, considering the shaft 5 to be rotating in a clockwise direction, as viewed from the rear, the hub 6 and blades 8 rotatably carried thereby will be moved axially of the shaft and relative thereto in response to the degree of thrust exerted by the blades, the link mechanisms referred to above being thereupon effective to rotate the blades about their longitudinal axes to vary the pitch. The springs 33 interposed between the plate 34 rigidly carried by the shaft, and the hub, will be effective during the above described thrust-responsive movement of the hub to yieldably resist such movement and arrest the forward travel of the hub in such a position as to yield a materially increased propeller efficiency for the thrust exerted by the blades under the given conditions. When, however, during operation of the propeller, the pitch has been reduced to such a value as to substantially lessen the load on the engine, the speed of the latter will materially increase and consequently effect an increase in the speed of the propeller. As soon as a speed of rotation of the propeller corresponding to the setting of weights 43 has been attained, the centrifugally-governed stop members 35 will move outwardly in response to centrifugal force to effect an engagement between teeth 40 and teeth 41 positioned on the stationary stop 42. When these teeth are in engagement, it will be readily appreciated that any further forward movement of the hub with respect to the shaft will be positively arrested and that any further decrease in the pitch of the blades is prevented. It will thus be observed that even though the power input of the engine be increased, the pitch-changing operation, in so far as reduction of pitch is concerned, is positively arrested and will not be resumed until either the speed of rotation of the propeller is decreased to such an extent as to permit the teeth 40 and 41 to become disengaged or the thrust of the propeller is reduced to permit the springs 33 to cause a partial return of the hub with respect to the shaft to effect an increase in the pitch of the blades.

Referring more particularly to Fig. 2, as heretofore pointed out, during operation, torsion on the blades will tend to reduce the pitch thereof, and as viewed in this figure will tend to rotate the blade 10 in a clockwise direction, thus placing links 32 in compression and moving the hub forwardly of the shaft 5, whereupon the pitch of the blades will be decreased. However, the effect of centrifugal force on the weighted portions 45 of the collars 18 secured to the root of each blade is such as to cause the collars 18 to tend to turn the latter in a counterclockwise direction, thus counteracting the above referred to torsion. It is to be pointed out, however, that in certain instances it may be desirable not to wholly counteract the torsion of the blades, in which event the links 32 due to a small amount of torsion, would always be in compression during operation.

There is thus provided by the present invention a novel variable pitch propeller of the type wherein automatic relative axial movement of the hub thereof with respect to the propeller shaft is employed for varying the pitch of the blades and embodying a novel mechanism for positively limiting such relative movement of the hub in one direction. The provision of the centrifugally-governed stop mechanism serves to positively limit a further decrease of the pitch of the blades beyond a predetermined minimum in a simple and efficient manner, and the use of such mechanism insures that the speed of rotation of the engine driving the propeller will not only not attain a dangerously high value but moreover will not even increase to such an extent as to materially reduce the operating efficiency of the engine.

While there has been shown and described only one embodiment of the invention, it is to be understood that the same is not limited thereto but may be embodied in various mechanical forms. For example, while the centrifugally-governed stop mechanism has been shown as being constituted as including suitable teeth for engagement with the corresponding stop, it will be appreciated that other means may be provided for effecting a positive engagement between these two members at a predetermined speed of rotation to prevent further movement between the hub and shaft in a direction such as to further decrease the pitch of the blades. It is also to be understood that various other changes may be made in the relative sizes, shapes and relative locations and component parts of the invention and that certain parts may be utilized without others if desired, without departing from the spirit of the invention, as well understood by those skilled in the art. Reference will therefore be had to the appended claims for a definition of the limits of the invention.

What is claimed is:

1. A propeller having a hub, a plurality of blades rotatably mounted therein, a rotatable shaft, means for drivably connecting said hub and shaft, means responsive to the thrust of said blades for moving the hub axially of said shaft, means operable during such movement to change the pitch of said blades, and centrifugally-responsive means for positively arresting movement of the hub axially of the shaft in one direction.

2. A propeller comprising a plurality of blades, a rotatable shaft, a hub, means for drivably connecting said hub and shaft, said hub being movable with respect to said shaft in response to the thrust of said blades, means including a link mechanism interconnected between said shaft and blades for rotating the latter about their longitudinal axes to vary the pitch during thrust-responsive movement of the hub, and means responsive to centrifugal force for positively arresting relative movement between said hub and shaft at a predetermined speed of rotation of the latter.

3. In a propeller having a plurality of blades, means for revolving said blades, means operable in accordance with the thrust of the blades for automatically varying the pitch of the latter, said means including pivoted members interconnected between said revolving means and said blades, and centrifugally operable means associated with said propeller independently of said members and operable at a predetermined speed of rotation of said first named means for rendering said automatically operable means ineffective to vary the pitch of the blades.

4. In a propeller having a plurality of blades, a hub rotatably mounting said blades, means responsive to the thrust of said blades for decreasing the pitch thereof, resilient means for increasing the pitch, and means pivotally mounted on said hub and automatically effective at a predetermined speed of rotation of the propeller for rendering said thrust-responsive means inoperative to decrease the pitch of the blades.

5. In a propeller having a hub, a plurality of blades carried thereby, a rotatable shaft drivably connected with the hub, said hub being automatically movable axially of the shaft for varying the pitch of the blades, means interconnecting said shaft and blades for varying the pitch of the latter during such axial movement of the hub, and means cooperating with said shaft and hub for positively limiting axial movement of the hub with respect to the shaft, said last named means being responsive to the speed of rotation of said rotatable shaft.

6. In a propeller having a rotatable shaft, a hub drivably connected with said shaft, a plurality of blades rotatably mounted in said hub, said hub being relatively movable with respect to said shaft in response to the thrust of the blades for varying the pitch of the latter, a stop member operatively connected with said shaft, and a pivoted member carried by said hub and operable to engage said stop member at a predetermined speed of rotation of the shaft in order to arrest relative movement between the hub and shaft in one direction at said predetermined speed of rotation.

7. In a propeller of the type having a plurality of blades, the pitch of which is automatically varied in accordance with the thrust thereof, the combination with said propeller, of a centrifugally operated stop mechanism, comprising relatively movable members adapted to engage and positively arrest the pitch-changing operation at a predetermined speed of rotation of the propeller.

8. In a variable pitch propeller of the type embodying a plurality of blades and a shaft drivably connected therewith, the combination with said propeller, of a pitch-limiting device for positively determining the lower pitch limit of said blades, said means including a stop operatively connected with said shaft, and a centrifugally-operable device adapted to positively engage said stop at a predetermined speed of rotation of the propeller.

9. In combination, a shaft, a hub drivably connected with said shaft, a plurality of blades rotatably carried by said hub, said hub being relatively movable with respect to said shaft to vary the pitch of said blades, a plate carried by said shaft forwardly of said hub and spaced therefrom, a plurality of resilient members interposed between said hub and said plate, a stop carried by said plate, and a pivoted member carried by said hub and operable in response to centrifugal force at a predetermined speed of rotation of the shaft to engage said stop.

10. In a propeller having a rotatable shaft, a hub drivably connected with said shaft, said hub being movable axially of said shaft, a plurality of propeller blades carried by said hub, connections interposed between said blades and shaft for rotating said blades to vary the pitch thereof during movement of said hub relative to said shaft, a plate carried by said shaft, a plurality of resilient members interposed between said hub and plate for controlling the axial movement of the hub relative to the shaft, a stop carried by said plate, a centrifugally-responsive member carried by said hub and resiliently maintained out of engagement with respect to said stop, said centrifugally-responsive member being operable at a predetermined speed of rotation of the shaft to positively engage said stop to arrest further relative movement between said hub and shaft.

11. A variable pitch propeller comprising a rotatable shaft, a plurality of blades drivably conneccted to said shaft and adapted for rotation about their longitudinal axes, means associated with said blades for causing rotation thereof about their longitudinal axes to change the pitch in response to the thrust of the blades, and means adjustable in response to centrifugal force and operable during movement of the pitch-changing means in one direction for positively arresting further movement of said means in the same direction in order to limit the reduction in pitch of the blades.

12. A variable pitch propeller comprising a rotatable shaft, a hub drivably connected to said shaft, a plurality of blades rotatably carried by said hub, said hub being axially movable of said shaft, means responsive to the axial movement of said hub for changing the pitch of the blades, and means for arresting movement of the hub in one direction, said means including a member carried by said shaft and a pivoted stop member carried by said hub for positively engaging said first member.

13. In combination with a rotatable shaft, a hub axially movable with respect to said shaft, said hub having a plurality of radially extending sockets, a propeller blade rotatably mounted in each socket, each of said blades cooperating with the hub to move the latter axially with respect to the shaft in accordance with the thrust of the blades, means yieldably opposing such axial movement, means interconnecting said shaft and blades for rotating the latter in the hub sockets to vary the pitch during such axial movement of the hub, means responsive to centrifugal force for substantially overcoming the torsion of the blades, and other means actuated by centrifugal force and responsive at a predetermined speed of rotation of said shaft for arresting further movement of the hub with respect to the shaft in one direction.

14. A propeller having a rotatable shaft, a plurality of blades, a hub drivably connecting said shaft and blades, said hub being movable forwardly of said shaft in accordance with the thrust and torsion of the blades to reduce the pitch of the latter, a plurality of resilient members yieldably opposing forward movement of the hub, a centrifugally operable means for partially neutralizing the effect of torsion on the blades, and separate means operable in accordance with centrifugal force for positively arresting forward movement of the hub at a predetermined speed of rotation of said shaft.

15. A propeller hub comprising a driving member adapted to be drivably connected to a rotatable shaft, a hub surrounding said member, means for drivably connecting said hub and member for relative longitudinal movement, a plurality of radially extending sockets provided in said hub for rotatably receiving propeller blades, resilient means interposed between said hub and said driving member for normally maintaining said hub in one position of its longitudinal movement, means interconnecting said blades and driving member for changing the pitch of said blades during relative movement between the hub and the driving member, and a plurality of stop members, pivotally mounted on said hub and resiliently maintained in one position of adjustment.

16. A propeller hub comprising a driving member, a hub member rotatable with said driving member and longitudinally moveable with respect thereto, said hub member being provided with a plurality of radially extending sockets, a sleeve rotatably mounted in each socket and adapted to receive a propeller blade, means for yieldably opposing longitudinal movement of the hub member in one direction, means interconnecting said sleeves and driving member for rotating said sleeves during longitudinal movement of said member, stop members carried by said driving member, and other stop members pivotally mounted on said hub and adapted to cooperate with said first-named stop members.

17. In a variable pitch propeller having a plurality of blades, means for automatically varying the pitch of said blades during operation of the propeller, and means including a self-adjusting mechanism directly responsive to centrifugal force and automatically operable for preventing further movement of said pitch varying means after a predetermined speed of rotation has been reached.

18. In a variable pitch propeller having a plurality of blades, means responsive to a condition of operation of the propeller for automatically varying the pitch of said blades, and means operable in accordance with another condition of operation of the propeller for preventing further movement of said pitch varying means after a predetermined speed of rotation has been reached.

19. In a variable pitch propeller having a plurality of blades, means responsive to a condition of operation of the propeller for automatically varying the pitch of said blades, and means including a self-adjusting mechanism directly responsive to centrifugal force and automatically operable for preventing further movement of said pitch varying means after a predetermined speed of rotation has been reached.

CLINTON H. HAVILL.